April 6, 1937.    P. M. A. GAUTHIER    2,076,337
APPARATUS FOR FIXING CAPS ON BOTTLES
Filed July 31, 1935    2 Sheets-Sheet 1
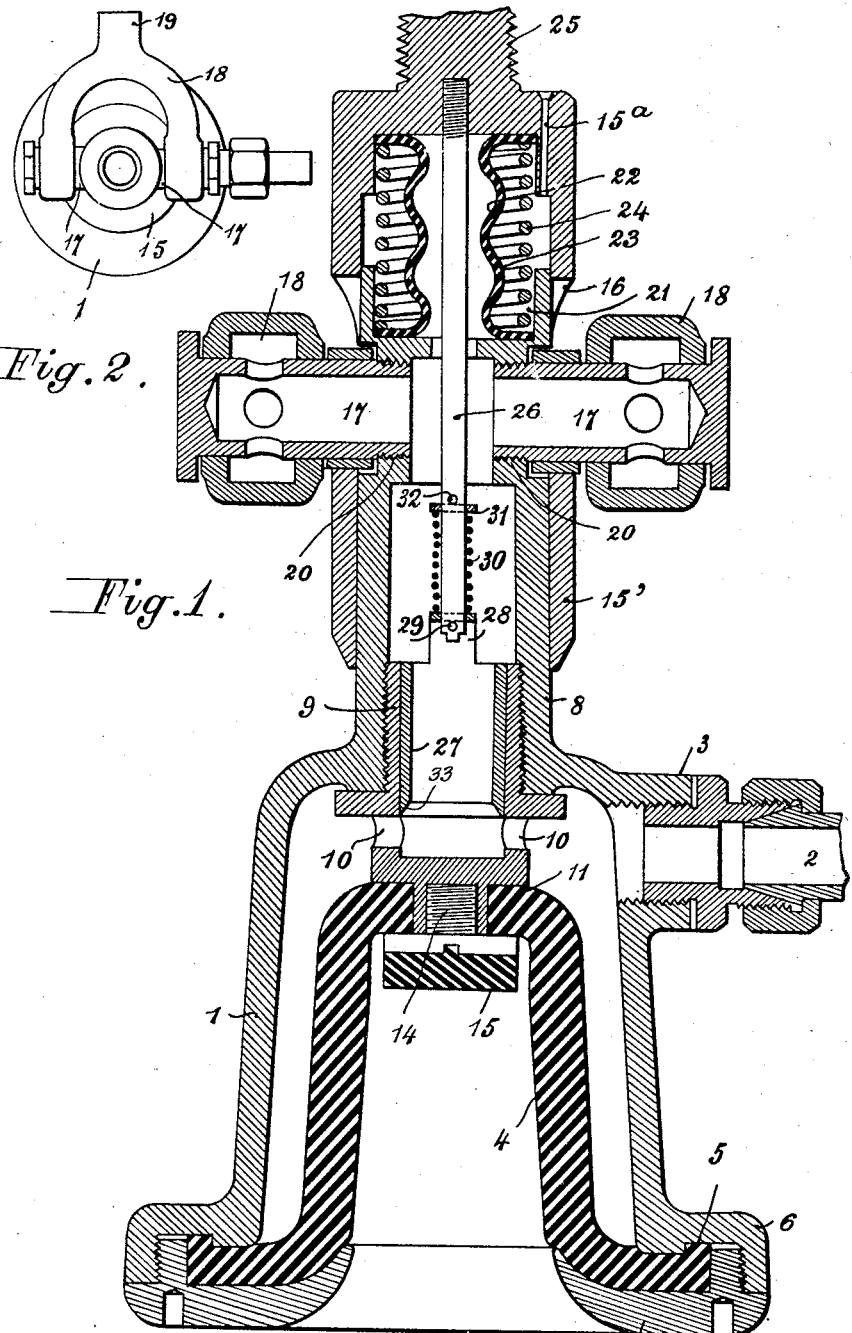
INVENTOR
PAUL M.A. GAUTHIER
BY
ATTY.

April 6, 1937.   P. M. A. GAUTHIER   2,076,337
APPARATUS FOR FIXING CAPS ON BOTTLES
Filed July 31, 1935   2 Sheets-Sheet 2

INVENTOR
PAUL M. A. GAUTHIER
BY
ATTY.

Patented Apr. 6, 1937

2,076,337

UNITED STATES PATENT OFFICE 2,076,337

APPARATUS FOR FIXING CAPS ON BOTTLES

Paul Marie Adrien Gauthier, Courbevoie, France

Application July 31, 1935, Serial No. 34,095
In France August 17, 1934

5 Claims. (Cl. 226—85)

It is known to fix caps on bottles by means of an apparatus in which a membrane serving to apply the cap on the neck of the bottle is deformed by means of a hydraulical pressure controlled from the exterior of the head of the apparatus.

According to this invention, the apparatus for fixing caps distinguishes from the known apparatus by the fact that the liquid under pressure flows continually through the apparatus, this flow being automatically interrupted when the neck of a bottle is introduced into and placed inside the deformable membrane. The pressure control thus takes place automatically, inside the head of the apparatus.

The apparatus consists of a casing having a part of its walls formed by the deformable membrane; this tightly closed casing is in permanent communication with a pressure conduit and it is in intermittent communication with a discharge conduit, by means of the displacements of a sliding valve which is actuated when the neck of the bottle is inserted into the deformable membrane.

The accompanying drawings show by way of example an embodiment of the invention.

Fig. 1 is a sectional elevation of the apparatus.

Fig. 2 is a plan view of the apparatus shown in Fig. 1.

Figure 3:
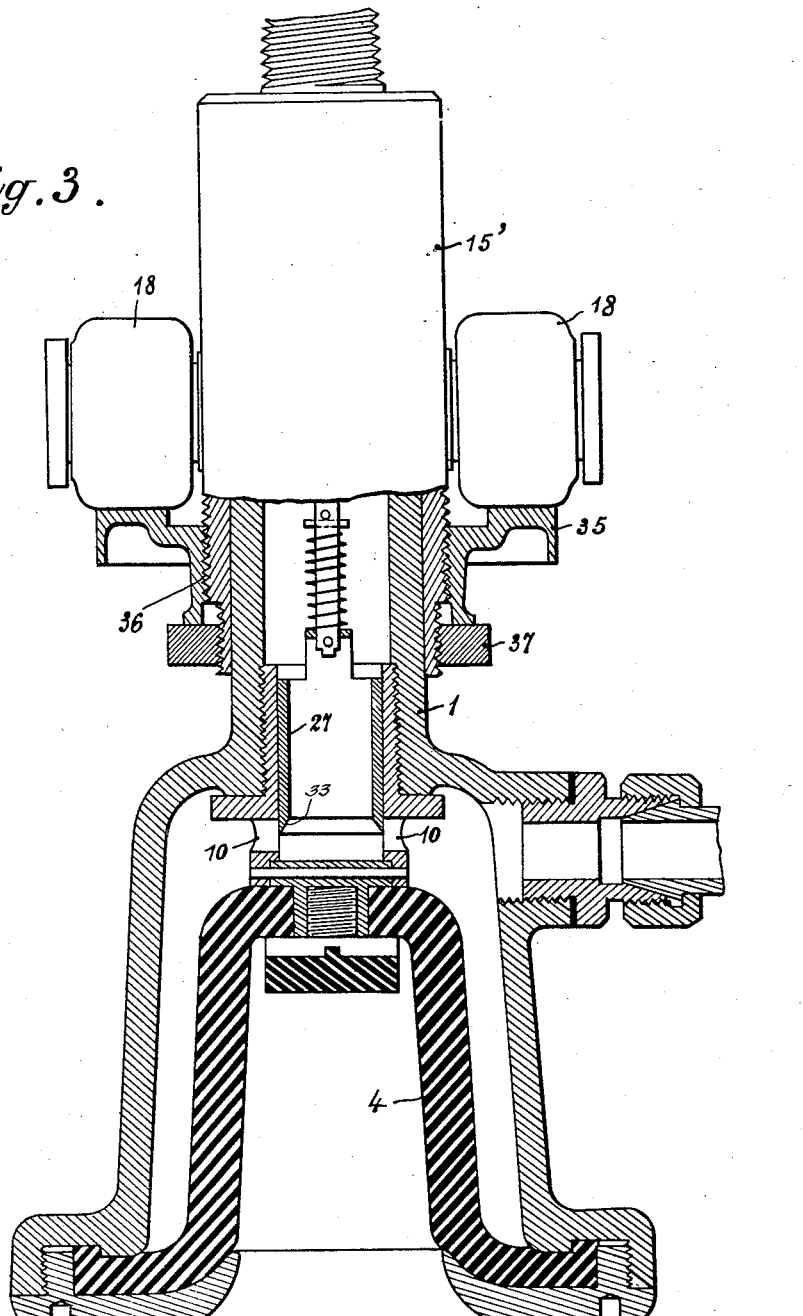
Fig. 3 is an elevation, partly in section, of a modification.

The apparatus embodying the invention comprises a metal casing 1 which communicates by means of a tube opening 3 with a pressure liquid conduit 2. The casing 1 is closed by a deformable bell-shaped member 4 made for example of rubber and the edge 5 of which is tightly clamped to the base 6 of the casing by means of a washer 7 of convenient shape.

The casing 1 is provided with a hollow cylindrical extension 8 the end of which is internally screw-threaded and receives a distributing cylinder 9 provided with openings 10.

The top 11 of the membrane 4 is secured to the bottom of the cylinder 9 by means of a screw 14. After mounting these parts in proper position, the head of the screw 14 is covered by a buffer 15 of rubber or the like material.

The cylindrical part 8 is engaged into a socket 15' which is provided with openings 16 for the passage of perforated tubes 17 on which is pivotally mounted the hollow member 18 establishing through its tube opening 19 a communication between the discharge conduit (not shown) and the casing 1.

The tubes 17 are screwed into openings 20 formed in the cylindrical member 8, perpendicular to its axis.

The upper part of member 8 is formed with a cup-shaped end 21 in which rests the lower flange of an elastic joint member 22 and a compressed spring 24 is applied upon said flange so as to insure the tightness of the closure. The part 23 of the joint member is corrugated so as to permit variations of its length during operation of the apparatus. The other flange of the joint member 22 and the other end of the spring 24 are applied against the bottom of the bore of the socket 15' which is fixed on a convenient support (not shown) by means of a threaded extension 25. A bore 15a provided in the bottom of the socket 15' avoids any counter-pressure.

Axially of the socket 15' there is screwed into the same a rod 26 on the lower end of which is mounted a sliding valve 27 which can be displaced with respect to the cylinder 9; the valve 27 is suspended upon the rod 26 by means of a suspension bow 28 integral with said valve and secured to the rod 26 by means of a pin 29 traversing the same.

A spring 30 under tension forms an elastic connection between the sliding valve 27 and the rod 26, said spring pressing against a washer 31 fixed by means of a second pin 32 secured in the rod 26. The lower end 33 of the valve 27 is bevelled so as to provide for a progressive throttling of the liquid during the closing of the discharge openings 10 of the casing 1 and to avoid the hydraulic shock which is likely to occur in a conduit when the openings are suddenly closed.

The shocks caused by the pressure and the counter-pressures are absorbed by the springs 24 and 30.

The apparatus for fixing caps on bottles works in the following manner:

The liquid under pressure flows through the casing 1, passing through the conduit 2, the openings 10 of the cylinder 9, the tubes 17 and the hollow discharge member 18.

When the neck of a bottle, on which a cap has been placed, is inserted into the deformable bell-shaped member 4, the latter is pushed back as well as the casing 1, whereby the cylindrical part 8 slides in the socket 15' which is fixed on a support.

During this movement, the bore of cylinder 9 slides upon the fixed valve 27 and the openings 10 are progressively closed, thus avoiding hydraulic shocks.

During closure of the openings 10, the pressure increases in the casing, as the flow of liquid decreases, and acts upon the deformable member 4 which is progressively pressed around the cap and forces it into the grooves of the neck of the bottle.

As soon as the openings 10 are completely closed, the whole pressure of the conduit 2 acts upon the member 4 and tightens it firmly around the bottle neck.

When the bottle is drawn back, the spring 24 pushes the device back to its normal position, the openings 10 are re-opened, the pressure decreases and the member 4 returns to its previous shape.

It is clear that the apparatus would be able to operate upon a fixed bottle, the head of the apparatus being lowered with member 4 surrounding the bottle neck.

In order to adapt the internal diameter of member 4 to different sizes of bottle necks, the pressure of the liquid normally flowing through the apparatus may be varied.

A means for obtaining this variation is shown in Fig. 3. It consists in a device for modifying the normal position of the valve 27 by means of displacing the casing 1 with respect to the socket 15'. This displacement may be operated by any convenient means, such as an annular abutment member 35 which is placed under the heads of the hollow member 18 and may be screwed up and down on a thread 36 provided on the socket 15'. By screwing the member 35 upwards, the members 18, 17, 8, 1 and 9 are lifted and the openings 10 partly closed, whereby a higher pressure is normally built up in the casing 1 and the member 4 is compressed to a smaller diameter.

It is evident that the design of the device may be varied without departing from the scope of the invention.

I claim,

1. An apparatus for fixing caps on the necks of bottles, comprising a casing, a deformable cup-shaped cap receiving member forming a part of the casing, a pressure liquid inlet to the casing, a pressure liquid outlet leading from the casing, a valve for controlling said outlet, and means for mounting the valve relative to the casing to cause the valve to be operated to close the outlet under endwise movement of the casing incident to the insertion of a bottle neck and cap into the cup-shaped member.

2. A construction as defined in claim 1, including means for varying the normal fluid pressure on the cup-shaped member to thereby vary the cap receiving diameter of said member to accommodate caps of varying sizes.

3. A construction as defined in claim 1, including means to initially position the valve to partly close the discharge conduit, whereby to increase the normal fluid pressure in the casing to correspondingly reduce the diameter of the cap receiving opening of the cup-shaped member under normal conditions.

4. An apparatus for fixing caps on the necks of bottles, comprising a casing, a deformable cup mounted in said casing so as to form an annular chamber between said casing and cup, a pressure liquid conduit connected to said casing, a discharge conduit connected to said casing, and a valve mounted in said discharge conduit, said valve being operable for closing said discharge conduit by pressure exerted upon a bottle neck inserted into said cup.

5. An apparatus for fixing caps on the necks of bottles, comprising a support, a casing slidably mounted upon said support, spring means urging said casing in one direction, a deformable cup mounted in said casing so as to form an annular chamber between said casing and cup, a pressure liquid conduit connected to said casing, said casing being formed with discharge openings, and a valve member mounted on said support and adapted to close said discharge openings when said casing is displaced against said spring means.

PAUL MARIE ADRIEN GAUTHIER.